(12) United States Patent
Grüll et al.

(10) Patent No.: US 6,936,109 B2
(45) Date of Patent: Aug. 30, 2005

(54) METHOD OF PRODUCING STARCH OR STARCH-CONTAINING PRODUCTS FROM STARCH-CONTAINING PLANT RAW MATERIALS, STARCH PRODUCTS, AND METHODS OF USING STARCH PRODUCTS

(75) Inventors: Dietmar Grüll, Langenschönbichl (AT); Robert Wittenberger, Katzelsdorf/Wienerwald (AT); Michel Marnik Wastyn, Schwechat (AT)

(73) Assignee: Suedzucker AG Mannheim/Ochsenfurt, Mannheim (DE)

( * ) Notice: Subject to any disclaimer, the term of this patent is extended or adjusted under 35 U.S.C. 154(b) by 35 days.

(21) Appl. No.: 10/727,206

(22) Filed: Dec. 3, 2003

(65) Prior Publication Data

US 2004/0115335 A1 Jun. 17, 2004

Related U.S. Application Data

(63) Continuation of application No. PCT/AT02/00162, filed on May 29, 2002.

(30) Foreign Application Priority Data

Jun. 7, 2001 (AU) ........................................ A 888/2001

(51) Int. Cl.[7] ........................ C08B 30/04; C09D 103/02; C09D 103/04
(52) U.S. Cl. ............................. 127/67; 127/32; 127/71; 536/102; 424/479; 424/493; 514/778; 426/103; 162/175; 106/206.1
(58) Field of Search .............................. 127/67, 71, 32; 536/102; 424/479, 493; 514/778; 426/103; 162/175; 106/206.1

(56) References Cited

U.S. PATENT DOCUMENTS 6,821,540 B2 * 11/2004 Cousin et al. .............. 426/237

FOREIGN PATENT DOCUMENTS

| AT | 410 941 B | 8/2003 |
|---|---|---|
| DE | 42 31 914 A1 | 3/1994 |
| FR | 2 239 524 | 2/1975 |
| WO | 99/64634 | 12/1999 |

OTHER PUBLICATIONS

"DTI Application Brief: Pulsed Electric Field Processing of foods" Diversified Technologies, Inc., 2002–2005 no month avail.*
Andrzej Hiller: "Applicability of a high–frequency electric field in the disinfection of wheat grain intended for food purposes", *Bromatol. Chem. Toksykol. vol. 5, No. 4,* (1972,), no month provided pp. 491–504, chemical abstract only, XP–002205382.
Alexander Angersbach et al.: "Effects of pulsed electric fields on cell membranes in real food systems", *Innovative Food Science & Emerging Technologies, vol. 1, No. 2,* (2000,), no month provided *pp. 135–149, chemical abstract only, XP–002205381*.
Dietrich Knorr et al.: "Food application of high electric field pulses", *Trends in Food Science & Technology,* (Mar. 1994, ), *vol. 5, pp. 71–75*.
Bart Mertens et al.: "Developments of Nonthermal Processes for Food Preservation", *Food Technology,* (May 1992) *pp. 124–133*.
Peter Brodelius: "Permeabilization of plant cells for release of intracellularly stored products: viability studies", *Appl. Microbiol. Biotechnol.,* (1998,) *No. 27, pp. 561–566*.
G. Tegge: Stärke und Stärkederivate, [starches and starch derivatives], (1984,) *pp. 79–125*.
T. Galliard et al.: "Morphology and composition of starch", in Starch: Properties and Potential, Critical Reports on Applied Chemistry, John Wiley & Sons (1987,), no month provided vol. 13, pp. 55–78.

* cited by examiner

*Primary Examiner*—David Brunsman
(74) *Attorney, Agent, or Firm*—Laurence A. Greenberg; Werne H. Stemer; Ralph E. Locher

(57) ABSTRACT

A method produces starch or starch-containing products from starch-containing plant raw materials. The method is distinguished by the inclusion of an electric pulse method.

44 Claims, 2 Drawing Sheets

METHOD OF PRODUCING STARCH OR STARCH-CONTAINING PRODUCTS FROM STARCH-CONTAINING PLANT RAW MATERIALS, STARCH PRODUCTS, AND METHODS OF USING STARCH PRODUCTS

CROSS-REFERENCE TO RELATED APPLICATION

This application is a continuation of copending International Application No. PCT/AT02/00162, filed May 29, 2002, which designated the United States and was not published in English.

BACKGROUND OF THE INVENTION

FIELD OF THE INVENTION

The invention relates to a method of producing starch or starch-containing products from starch-containing plant raw materials.

When recovering starch from plant raw materials, the starch must be freed from the matrix of the plant cell and separated or isolated, respectively, from the other cellular components. When this is done on an industrial scale, contaminations of the starch with proteins, lipids or (micro) fibers always occur. Moreover, in its natural form the starch closely interacts with diverse components, such as, e.g., proteins and lipids, which in part are tightly associated with the surface of the starch grain, or bound more or less tightly to the starch molecules within the starch grain, respectively. Such contaminations may cause problems during the use of the starch products produced therewith. For instance, it has been known that as a consequence of such contaminations, starch may entail disadvantages in terms of color, taste, or allergens in the food or pharmaceutical industries. Furthermore, it has been known that complexes of starch with proteins and lipids cause drawbacks in the paper-making industry, e.g. during the surface treatment of paper, resulting in deposits, e.g., whereby the runnability of a paper-making machine is adversely affected. Moreover, such residual substances may adversely affect the paper quality, in particular the whiteness of papers. In addition, in the textile industry, conventionally industrially produced starches are detrimental for many applications because they can be filtered to a limited extent only and require increased servicing due to deposits or clogging, respectively.

SUMMARY OF THE INVENTION

It is accordingly an object of the invention to provide a a method of producing starch or starch-containing products from starch-containing plant raw materials, starch products, and methods of using starch products that overcome the hereinafore-mentioned disadvantages of the heretofore-known devices of this general type and that involve highly pure starch having a low degree of contamination with lipids, proteins, DNA, (micro)fibers, starch pockets etc. Such starches can be used in sensitive fields of application.

According to the invention, this object is achieved by a method of producing starch, organic starch or starch-containing products from starch-containing plant raw materials, that is distinguished by utilizing an electric pulse method.

The application of electric pulse methods in the field of food industry or for the breaking up of plant raw materials in general has long been state of the art (cf., e.g., "Trends in Food Science & Technology" 5 (3) (1994), pp 71–75). This method has mainly been used for producing fruit juices from carrots, apples and the like, or for preventing the growth of microorganisms (Food Technology 5 (1992), pp 124–133). Further applications related to the preparation of low-molecular compounds from plant cells in which the improved cell sap extraction from these cells has been utilized after such a treatment. Examples of such compounds are amaranthine from Chenopodium rubrum (Trends in Food Science & Technology, 5 (3) (1994), pp 70–99) or sucrose from sugar beets (WO 99/64634 A). In other compounds, however, this method did not yield the desired effect. (Trends in Food Science & Technology, S (3) (1994), pp 71–75). It has also been suggested to extract water-soluble intracellular products after a fermentation process by gentle electric pulse methods, while maintaining the viability of the cells (Appl. Microbiol. Biotechnol. 27 (1988), pp 561–566).

Surprisingly, with the present invention it could be shown that the electric pulse method is also suitable to efficiently extract highly complex and polymeric substances, such as starch, from plant cells, wherein the electric pulse method exhibited the enormous advantage in the recovery of starch that with this method also intimate contacts of proteins, yet also of lipids and nucleic acids, with the starch polymers can be destabilized in a manner such that the latter can be depleted and purified much more efficiently in the conventional industrial downstream methods in the preparation of starch.

Thus, industrially produced starches having a noticeably reduced content of proteins, but also a reduced content of lipids, microfiber substances and other contaminations, such as DNA, colorants etc., are obtainable. Preferably, the method according to the invention is primarily carried out by using potatoes or cereals, in particular maize, waxy maize or wheat, as plant raw materials, yet basically is also has considerable advantages when it is used to produce or use all the known starches from tubers and cereals. Primarily with maize—due to the high lipid content of the maize germs—there exists a particularly high degree of contaminations or a contamination potential with lipids, which can successfully be prevented with the process according to the present invention. Moreover, the natural content of lipids in the cereal starches is high and can be markedly improved by using this method.

One problem in the application of starch, such as, e.g., in the paper-making industry, are the so-called "starch pockets" which are non-disintegrated cell associations and usually have a size from 50 $\mu$m to 200 $\mu$m leading, as has been mentioned before, to agglomerations and deposits hitherto considered to be unavoidable. Surprisingly, it has been shown that when the starch-containing plant raw materials have been treated according to the invention with the electric pulse method, the resultant starch product is absolutely free from such starch pockets, or the content of starch pockets can be reduced to a level that even in sensitive fields of application will not lead to the drawbacks described before.

By the improved protein separation, which is a consequence of the treatment with the electric pulse method, starch-binding proteins can be removed more efficiently within the scope of conventional downstream processes, and enzyme activities that cause a deterioration of the quality of the starch can be prevented. In this context, primarily the inhibition of oxidoreductases must be mentioned, since these enzymes can cause discolorations in starches. By using the electric pulse method, e.g., phenoloxidases can be efficiently inactivated during the processing of potatoes. Thus, the addition of $SO_2$ or other inhibitors of these enzyme activities can substantially be reduced, or completely avoided, respectively.

According to the invention, it has been shown that due to the electric pulse method, an enhanced separability between starch and protein can efficiently be utilized already in the primary separator, since the starch milk (underflow) has a substantially lower protein content than starting materials treated by non-electric pulse methods. Due to this improved separability of the protein, a markedly better quality of the crude starch milk can be produced, on the one hand, and the protein content of the adhesive fraction can be significantly increased, on the other hand.

It has also been shown that, e.g. by changing the cell wall strength, a reduced fiber formation will occur when grinding, or breaking, respectively, the raw materials, and the liberated starch therefore can be refined in the hydrocyclone plant much more easily, resulting in a higher purity of the starch, in particular of the fine starch.

Add to this that the per se known microorganism-inhibiting effect of the electric pulse method also entails a reduced microbiological load on the plant material during the production process. Thus, the addition of biocides and other antimicrobial agents, in particular an addition of $SO_2$, can be avoided or at least reduced. By using the electric pulse method in the production process of starch, the microbiological load on the final products can clearly be reduced, and thereby often additional process steps for inhibiting or reducing the microbiological contamination during the process or in the end products can be avoided. Thus, e.g., an additional lowering of the pH of the crude starch milk to approximately 3.5 with $SO_2$ or with mineral acids prior to, or during the refining of the starch, respectively, is no longer necessary. Often the microbiological load on the end products is improved by an oxidative treatment. Since this treatment may adversely affect the quality of the starch, e.g. by acid-hydrolytic or oxidative degradation (e.g. by reducing the viscosity of the starch), by using the electric pulse method not only microbiologically sound products, but also products of a high quality are produced.

When producing organic starches, the use of any chemicals whatsoever must be avoided. Thus, e.g., during the swelling of organic maize, no $SO_2$ or any other inorganic acids may be added. When grinding organic potatoes, no chemicals must be used for inhibiting the quality-lowering enzyme activities.

In addition, no measures must be taken for controlling the microbiology during the process and in the end products. Thus, these products often do not achieve the purity and quality of the products otherwise commercially available. By using the electric pulse method, it has become possible for the first time to produce genuine organic starches of high quality and purity, even though an addition of $SO_2$ is completely avoided. Above all, according to the invention it has also become possible for the first time to produce organic maize starch, and organic waxy maize starch, respectively, of noticeably improved quality and purity.

The reduced use of biocides and $SO_2$, respectively, as well as the antimicrobial effect of the electric pulse method also enable longer operating times in the starch factory with an unchanging good quality of the final products. Thus, the intervals of cleaning can be lengthened. This is particularly true for the recovery of organic starches whose production otherwise is possible in short units only. Thus, with the use of the electric pulse method, an the production of organic starches, in particular of organic cereal starches, not only with regard to their quality but also from the economical point of view, can be optimized.

Within the scope of the present invention, the electric pulse method may very well be accomplished according to the parameters described for other objectives (e.g. WO 99/64634). Accordingly, the electric pulse method preferably is carried out at a field strength of from 0.1 to 50 kV/cm, preferably at 0.5 to 20 kV/cm, in particular from 1 to 10 kV/cm. The pulse frequency may preferably be 1 to 2000 pulses per second, more preferred from 5 to 1000 pulses per second, in particular 5 to 100 pulses per second.

It has also been known (cf. WO 99/64634) that by using the electric pulse method, the degradation method for plant raw materials involves requires less energy. Therefore, the electric pulse method according to the invention preferably is carried out with an energy input of from 1 to 100 kJ/kg raw material, preferably 2 to 75 kJ/kg, in particular from 5 to 50 kJ/kg.

Preferably, the plant raw material as a whole or in broken form is already subjected to the electric pulse method. According to the invention, preferably thus a disintegrating step can precede the electronic pulse method. It is therefore preferred to subject whole potatoes, potato pieces, potato waste material from the potato-processing industry, potato grindings, maize mash, waxy maize mash, wheat, and other cereals to the electric pulse method. Particularly, potatoes and wheat can be used industrially in non-disintegrated form. Another preferred aspect of the invention is the treatment of broken maize and broken waxy maize before grinding. In a particularly preferred variant of the invention, this broken material is freed from the plant germs and separated therefrom, and thus, the degermed broken material is treated. A further preferred variant of the invention is the treatment of potato pulp, cereal fibers and crude starch milk, wherein the treatment of starch milk can be effected at various stages during its refinement, i.e. from the formation of crude milk after grinding or milling, respectively, up to the refined starch slurry or concentrated moist starch cake, respectively, before the latter is dried. A further variant of the invention is the treatment of dried starch products by stirring the latter in water and treating them with the electric pulse method.

Preferably, the swelling of the plant raw material can also be shortened and the use of $SO_2$ can be reduced, in particular if one starts with a cereal raw material, such as, e.g., maize or waxy maize. Usually, sulfur dioxide at concentrations of from 0.1 to 0.3% is added to this swelling solution (cf. G. Tegge, "Stärke und Stärkederivate" (1984), pp 79–125, in particular p. 118). According to the invention, however, also swelling solutions containing less than 0.1% sulfur dioxide, preferably less than 0.01% sulfur dioxide, in particular, sulfur-dioxide-free solutions, can be used. The last-mentioned method variant is of particular importance in the swelling of organically grown raw materials, such as organic maize and organic waxy maize. With the method according to the invention, however, organic starches can be produced from all starches (e.g., also from potatoes), since the preparation can be effected without the addition of $SO_2$ or biocides.

According to a further aspect, the present invention also relates to a starch product obtainable by a method according to the present invention. The starch obtainable according to the invention differs substantially from the (industrial) starches previously produced in the prior art, in particular as regards their contents of contaminants or accompanying substances, such as, e.g., proteins. Thus, starch products according to the invention preferably will have a protein content of below 0.05% in the dry substance (DS), whereas the protein content of starches not treated with the electric pulse method is above these levels, depending on the plant raw material used. Thus, non-electric pulse-treated starches from maize have a protein content of from 0.2 to 0.4% in DS, and a lipid content from 0.5 to 0.9 % in DS, potato starches have a protein content of from 0.05 to 0.2% in DS and a lipid content of from 0 to 0.2% in DS, and wheat starches have a protein content of from 0.1 to 0.6% in DS and a lipid content of from 0.7 to 1.2 % in DS (cf. Critical Rep. on Appl. Chemistry, 14 (1987), Galliard; Wiley & Sons).

In comparison thereto, electric pulse-treated starches obtainable according to the invention have clearly reduced contents in terms of lipids, proteins and DNA. For instance, according to the invention a maize starch can be produced which has a protein content of below 0.2% in DS and possibly has a lipid content of below 0.5% in DS. Potato starches can be produced which have a protein content of below 0.05% in DS, as well as wheat starches which have a protein content of below 0.1% in DS and, possibly, a lipid content of below 0.7% in DS. Therefore, a particularly preferred starch according to the present invention has less than 10 ml, in particular, less than 5 ml, of sediment per 50 g of starch (cf. determination method in the protein precipitation test in the Examples).

As has been mentioned, the starch products obtainable according to the invention also have a clearly reduced content of fibers that also include starch pockets. The latter are determined by sieving off an aqueous starch slurry via a 50 $\mu$m sieve. The content of fibers and starch pockets, e.g. of maize starch, is reduced from an average of 0.1% to less than 0.01%, based on the dry substance (cf. also the determination of the fine fiber content in the Examples).

Therefore, according to the invention generally starch products are obtainable which, compared to conventional starches not produced by the electric pulse method, have a content of starch pockets reduced by at least 50%, preferably by at least 80%, in particular by at least 95%.

Accordingly, according to the invention whiter starch products, primarily whither organic starches, can be obtained. Furthermore, according to the invention, a better dehydration of the fibers for producing animal feedstuffs is possible, and therefore less drying energy is required. Because of the changed interaction between starch and protein, also refining of the starch in hydrocyclone plants is easier. Likewise, the fine fibers and residual protein can be removed from the hydrocyclone plant more easily, resulting in reduced protein and fiber contents.

The starch produced according to the invention not only exhibits a marked reduction of the accompanying substances, but on account thereof also an improved derivatizing ability by higher reaction yields, shorter reaction times, a reduced use of chemicals, a reduced formation of by-products and reduced waste water loads. The production of starch derivatives, such as, e.g., carboxymethyl starch (CMS), propoxylated starches, cross-linked starches or degraded starches (thermally, thermochemically or enzymatically) is not only facilitated thereby, but it allows for the production of products of improved quality. Thus, accompanying substances of starch, such as, e.g., protein, lead to Maillard side reactions if the reaction is carried out under alkaline conditions at elevated temperatures, such as, e.g., in the carboxymethylation of starch, the Maillard side reactions causing a yellowing of the final product. This discoloration often has detrimental effects when using the starch. The use of starch with reduced accompanying substances allows for the production of derivatized starches with a markedly improved color. Preferably, therefore within the scope of the method according to the invention, the starch is derivatized and/or physically modified, thereby providing a derivatized and/or physically modified product.

Such starches produced according to the invention, organic starches and starch derivatives obtained therefrom, respectively, are preferably mainly usable in sensitive and more demanding fields of use, thus, e.g., in the foodstuffs, cosmetics and pharmaceutical industries, in the paper-making industry and in the surface treatment of paper, in the field of adhesives and textiles, in particular as a printing thickener.

Therefore, in a further aspect the present invention relates to the use of a starch product produced according to the invention as a food additive, as a component or auxiliary agent in the production of cosmetics (e.g. in ointments, powders, shower gels, as thickeners, emulsifying auxiliaries, powders for condoms etc.) and pharmaceutical preparations, such as tabletting auxiliaries, tablet disintegrants, plasma expanders, as well as in pharmaceutically employable articles of use, such as, e.g. powders for gloves etc., as an agent for the surface treatment of paper, such as, e.g., surface glue or a binder for paints, as an additive in the paper-making industry, as an adhesive, such as, e.g., wallpaper glue, cigarette glue, as well as a printing thickener in the textile industry. Of course, the starch products produced according to the invention also may be used for all other purposes described for starch.

In the food industry, the high-purity starch according to the invention mainly offers advantages in terms of its color, its taste, and its reduced portion of allergens (both on protein and on DNA level). These advantages are particularly pronounced in the organic starches and their physically modified derivatives.

In the surface treatment of paper, the high-purity starch according to the invention exhibits a clearly improved runnability of the paper-making machine, a reduced tendency to foaming in the glue circulation, a reduced formation of deposits on the rolls and in the glue container, and a reduced amylose crystallization tendency (primarily with cereal starch, such as, e.g., maize starch). Due to the higher degree of whiteness of the starch products according to the invention, in particular in case of maize starches and their derivatives, the paper quality produced, particularly with regard to whiteness, is clearly improved. Also, when used in the paper mass, there will be no negative influence on the whiteness of high-quality papers, even if higher amounts are used (more than 0.5% per paper).

In addition, in the textile industry, primarily as a printing thickener, the starches produced according to the invention have an enormous advantage with regard to their improved filterability. Printing of textiles usually is accomplished with printing screens of very small mesh widths. A substantial requirement made on the starch derivatives employed as thickeners for printing pastes and others is a high purity and filterability, respectively (cf. determining method of the filterability of printing thickeners in the Examples). Here, it is mainly the starch pockets and other accompanying substances of the starch that normally restrict the usability of such starches. According to the invention, however, starches having a filterability of >600 g alkaline, or 300 g acidic, respectively, can be provided. It is just these quality requirements that allow for the industrial applications in the printing thickener so that in practice the printing screens will not be clogged: >600 g alkaline means here that 600 g of starch DS as an 8 or 10% glue are filterable through a 32 $\mu$m metal gauze without any problems, >300 g in the acidic range means that 300 g of starch DS as a glue with the addition of citric acid also are filterable via 32 µm without any problems.

Other features that are considered as characteristic for the invention are set forth in the appended claims.

Although the invention is illustrated and described herein as embodied in a method of producing starch or starch-containing products from starch-containing plant raw materials, starch products, and methods of using starch products, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawings in detail, the following examples are illustrative of the invention.

EXAMPLE 1

Inventive Production of Starch Products, Using the Electric Pulse Method (EPM)

For the EPM treatment of whole potatoes, potato grindings, maize mash, wheat and starch slurries, different parameters have to be chosen in accordance with the processing aims desired. The most important parameters are the electric field strength, the number (and also the length) of the electric pulses, and the specific energy introduced.

The specific energy is an important parameter insofar as this value can be directly compared with an energy introduced, e.g., by thermal treatment. The level of the electric field strength will depend on the type of the cells to be destroyed by the treatment. To break up plant cells, as a tendency less energy will be required than to break up microorganisms.

Starting from the range of 20 kV/cm, however, there is the risk of a pronounced heating as far as to pyrolysis by plasma formation. Moreover, the energy used will increase so that the economy of the EPM may be questionable as compared to conventional break-up methods.

TABLE 1

| Parameter EPM | Application | Preferred Range |
| --- | --- | --- |
| Electric field strength: | Improvement in protein and lipid separation and starch yield, destruction of starch pockets | 0.1–50 kV/cm |
| Electric field strength: | Microorganisms | 15–60 kV/cm |
| Pulse frequency (number): | general | 1–1500/s |
| Energy regarding amount used: | general | 2–75 kJ/kg |

EXAMPLE 2

Examination of the Protein and Lipid Contents of Maize, Potato and Wheat Starch

The effects of the electric pulse treatment on three different types of starch are clearly apparent in a reduction of the protein and lipid contents. The thus treated starches show an improvement in their application-technological properties.

TABLE 2

Protein and lipid contents of commercially available starches without and with EPM treatment

| | Water content [%] | Non-treated* [%] in DS | | EPM-treated [%] in DS | |
| --- | --- | --- | --- | --- | --- |
| | | Protein content | Lipid content | Protein content | Lipid content |
| Maize | 11–14 | 0.2–0.4 | 0.5–0.9 | 0.05–0.2 | 0.1–0.5 |
| Potatoes | 12–17 | 0.05–0.2 | 0–0.2 | 0.01–0.05 | 0 |
| Wheat | 11–14 | 0.1–0.6 | 0.7–1.2 | 0.05–0.2 | 0.3–0.7 |

*Source: Starch: properties and potential (Critical Rep. on Appl. Chemistry, 14, Galliard, Wiley & Sons (1987).

EXAMPLE 3

Microscopic Examinations

Prior to microscopy, an approximately 5% aqueous suspension is prepared from the starch and applied to a slide. The images were recorded with a digital camera, with the microscope magnifying 200 times.

Figure 1:
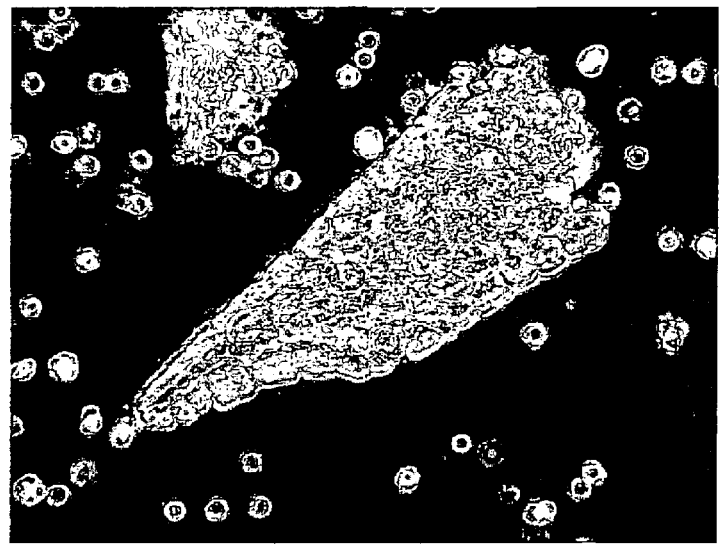
FIG. 1 is a photograph showing maize starch with starch pockets without EPM (electric pulse method) treatment.
Figure 2:
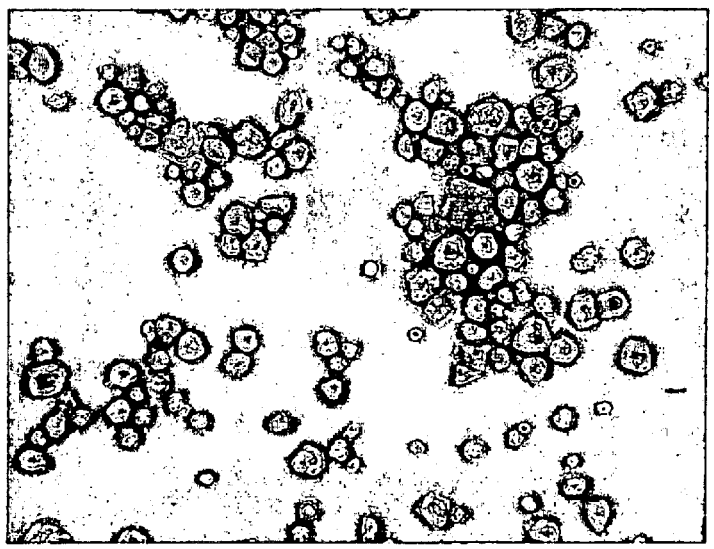
FIG. 2 is a photograph showing maize starch (individual maize kernels) after an EPM treatment according to the invention.

FIG. 1 shows the typical image of a so-called starch pocket which mostly have sizes of from 50 µm to 200 µm. They are easy to destroy by the treatment with the EPM. In FIG. 2, a thus treated sample can be seen which does not show starch pockets any longer. The sharp-edged delimited structures represent individual starch grains.

The dissolution of these starch pockets results in a positive effect on the application-technological properties, such as, e.g., the filterability of the starch glues.

EXAMPLE 4

Protein Precipitation Test

This test for examining the quality of maize starch recovered with the assistance of high voltage electric pulses mainly is a measure of the purity of the inventively produced starch and demonstrates its usability, e.g. in the surface treatment of paper.

Implementation: 50 g of starch are weighed in a beaker and stirred with 450 g of deionized water. The starch suspension is admixed with 3 ml of a commercial α-amylase (Opitherm from Solvay, e.g.), heated to 100° C. in an oil bath under stirring and kept at this temperature for 5 minutes. Subsequently, the beaker is taken from the oil bath, and the enzymatically degraded starch glue is filled into an Imhoff cone. Now the starch glue is allowed to stand at room temperature for 24 h. Subsequently, the sedimented amount is read (ml).

|  | Commercial Maize Starch | Treated Maize Starch |
|---|---|---|
| Amount sedimented | 10 ml | 2 ml |

Figure 3A:
FIG. 3A is a photograph showing the result of a protein precipitation test of untreated maize starches.
Figure 3B:
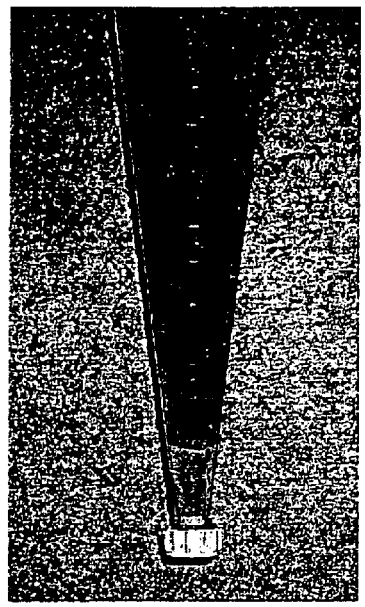
FIG. 3B is a photograph showing the result of a protein precipitation test of treated maize starches.

For a better illustration see FIGS. 3A and 3B.

Evaluation: After the enzymatic degradation, the treated starch shows a markedly lower amount of sediment. This sediment substantially formed of protein, fats, and fibers. The fewer the accompanying substances of the starch, and consequently, the less the sediment, the better the application in the paper-making industry, e.g. for the treatment of the paper surface (reduced or no foam-forming tendency of the degraded glue, less or no formation of deposits on the rolls, reduced tendency to RAPS (retrograded amylose particle) formation, improved runnability of the paper-making machine and, finally, improved quality of the paper produced).

EXAMPLE 5

Determination of the Fine Fiber Content

This test serves to determine the fine fiber content of starches such as, e.g., maize starch that has been recovered with the assistance of high voltage electric pulses.

Implementation: 50 g of starch are weighed in a beaker and stirred with 200 g of deionized water. The starch suspension is treated in the ultrasonic bath for 10 min to dissolve agglomerates and subsequently put over a dried, counterbalanced 50 μm sieve. To remove adhering starch grains, it is intensively rewashed with tap water. Subsequently, the sieve is dried in the drying cabinet for 45 min at 120° C. and weighed.

|  | Commercial maize starch | Treated maize starch |
|---|---|---|
| Fine fibers >50 μm [%] in DS | 0.1 | 0.01 |

EXAMPLE 6

Determination of Filterability

This test serves to determine the filterability of starch derivatives that are employed as thickener for textile prints, and it is a measure of the purity and suitability of the printing thickener.

Implementation: In 6900 g of soft water, 600 g of printing thickener are interspersed and stirred for 5 min at 3000 rpm by using a propeller mixer. The glue is allowed to swell for 1 h at room temperature, and subsequently it is shortly stirred by hand. Now the thus produced glue is filtered over a 32 μm metal gauze at a defined negative pressure of 0.5 bar. Filtration is stopped when the gauze has become clogged. The filtered amount of glue is weighed, and the amount of filtered starch is recalculated. Commercially available printing thickeners exhibit filterabilities ranging from 300 to 600 g. Excellent products have filterabilities higher than 600 g. Products having filterabilities of below 300 g are not suitable for textile prints.

|  | Commercial printing thickeners | Printing thickeners based on treated maize starch |
|---|---|---|
| Filterability over 32 μm | 350 g | >600 g |

We claim:

1. A method of producing starch, organic starch, or starch-containing products from starch-containing plant raw materials, which comprises performing an electric pulse method on the starch-containing plant raw materials.

2. The method according to claim 1, which comprises selecting the plant raw materials from the group consisting of potatoes, cereals, maize, waxy maize, and wheat.

3. The method according to claim 1, which comprises performing the electric pulse method at a field strength from 0.1 to 50 kV/cm.

4. The method according to claim 1, which comprises performing the electric pulse method at a field strength from 0.5 to 20 kV/cm.

5. The method according to claim 1, which comprises performing the electric pulse method at a field strength from 1 to 10 kV/cm.

6. The method according to claim 1, which comprises performing the electric pulse method with a pulse frequency from 1 to 2000 pulses per second.

7. The method according to claim 1, which comprises performing the electric pulse method with a pulse frequency from 5 to 1000 pulses per second.

8. The method according to claim 1, which comprises performing the electric pulse method with a pulse frequency from 5 to 100 pulses per second.

9. The method according to claim 1, which comprises performing the electric pulse method with an energy input from 1 to 100 kJ/kg raw material.

10. The method according to claim 1, which comprises performing the electric pulse method with an energy input from 2 to 75 kJ/kg raw material.

11. The method according to claim 1, which comprises performing the electric pulse method with an energy input from 5 to 50 kJ/kg raw material.

12. The method according to claim 1, which further comprises:
    providing the plant raw material in broken form; and
    subjecting the plant raw material to the electric pulse method while the plant material is in the broken form.

13. The method according to claim 1, which comprises selecting the plant raw material subjected to the electric pulse method from the group consisting of whole potatoes, potato grindings, maize mash, waxy maize mash, wheat, and starch slurries.

14. The method according to claim 1, which further comprises swelling the plant raw materials in a swelling solution containing less than 0.1% sulfur dioxide.

15. The method according to claim 14, wherein the plant raw materials include maize raw material.

16. The method according to claim 1, which further comprises swelling the plant raw materials in a swelling solution containing less than 0.01% sulfur dioxide.

17. The method according to claim 1, which further comprises swelling the plant raw materials in a swelling solution containing no sulfur dioxide.

18. The method according to claim 1, which further comprises preventing addition of $SO_2$.

19. The method according to claim 1, which further comprises preventing addition of biocides.

20. The method according to claim 1, which further comprises derivatizing the starch.

21. The method according to claim 1, which further comprises physically modifying the starch.

22. The method according to claim 1, which further comprises using at least one organic starch as the starch product.

23. A starch product having a protein content below 0.05% in dry substance (DS) obtained via the method according to claim 1.

24. The starch product according to claim 23, having a starch content reduced by at least 50% compared to conventional starches not produced by the electric pulse method.

25. The starch product according to claim 23, having a starch content reduced by at least 80% compared to conventional starches not produced by the electric pulse method.

26. The starch product according to claim 23, having a starch content reduced by at least 95% compared to conventional starches not produced by the electric pulse method.

27. A starch product having a protein content below 0.05% in dry substance (DS).

28. The starch product according to claim 27, further comprising a starch forming less than 10 ml of sediment per 50 g of starch.

29. The starch product according to claim 28, wherein said starch forms less than 5 ml of sediment per 50 g of starch.

30. The starch product according to claim 28, wherein said starch is at least one of derivatized and physically modified.

31. A method of using starch products, which comprises:
providing the starch product according to claim 27; and
using the starch product as a food additive.

32. The method according to claim 31, which further comprises using at least one organic starch as the starch product.

33. A method of using of using starch products, which comprises:
providing the starch product according to claim 27; and
treating a surface of paper with the starch product.

34. A method of using starch products, which comprises:
providing the starch product according to claim 27; and
using the starch product in a textile.

35. The method according to claim 34, which further comprises using the starch product as a printing thickener.

36. The method according of using starch products, which comprises:
providing a starch product according to claim 27; and
adding the starch product to a paper mass.

37. A method of using starch products, which comprises:
providing a starch product according to claim 27; and
producing at least one of a pharmaceutical preparation and a pharmaceutically applicable article with the starch product.

38. The method of using organic starches, which comprises:
providing a starch product according to claim 27; and
using the starch product in a cosmetic.

39. The method according to claim 38, which further comprises using at least one organic starch as the starch product.

40. A starch product, comprising maize starch and having a protein content below 0.2% in DS.

41. The starch product according to claim 40, further having a lipid content below 0.5% in DS.

42. A starch product, comprising potato starch and having a protein content from 0.01 to 0.05% in DS.

43. A starch product, comprising wheat starch and having a protein content below 0.1% in DS.

44. The starch product according to claim 43, having a lipid content of below 0.7% in DS.

* * * * *

UNITED STATES PATENT AND TRADEMARK OFFICE
CERTIFICATE OF CORRECTION

PATENT NO. : 6,936,109 B2
DATED : August 30, 2005
INVENTOR(S) : Dietmar Grüll et al.

It is certified that error appears in the above-identified patent and that said Letters Patent is hereby corrected as shown below:

<u>Title page,</u>
Item [30], Foreign Application Priority Data, should read as follows:
-- Jun. 7, 2001    (AT)    ………. A 888/2001 --.

Signed and Sealed this

Twenty-second Day of November, 2005

JON W. DUDAS
*Director of the United States Patent and Trademark Office*